United States Patent
Blower et al.

(10) Patent No.: US 9,122,758 B1
(45) Date of Patent: Sep. 1, 2015

(54) COLLABORATIVE BROWSING AND CHAT SESSIONS

(71) Applicant: Amazon Technologies, Inc., Reno, NV (US)

(72) Inventors: Aaron Z. Blower, Vashon, WA (US); Andrew J. Holtzclaw, Seattle, WA (US); Meenakshi Jain, Bellevue, WA (US); Chetan Kumar, Seattle, WA (US); Teresa S. K. Lau, Bellevue, WA (US); Raghavendra Nyamagoudar, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 294 days.

(21) Appl. No.: 13/645,383

(22) Filed: Oct. 4, 2012

(51) Int. Cl.
*G06F 3/00* (2006.01)
*G06F 17/30* (2006.01)

(52) U.S. Cl.
CPC ................ *G06F 17/30867* (2013.01)

(58) Field of Classification Search
CPC .................... G06F 17/30867; G06Q 30/02
USPC .................... 715/736, 758, 750, 751
See application file for complete search history.

(56) References Cited

U.S. PATENT DOCUMENTS

| | | | | |
|---|---|---|---|---|
| 8,359,285 | B1 * | 1/2013 | Dicker et al. | 706/45 |
| 8,386,336 | B1 * | 2/2013 | Fox et al. | 705/26.7 |
| 8,392,360 | B1 * | 3/2013 | Dicker et al. | 707/608 |
| 8,527,591 | B2 * | 9/2013 | Pirnazar | 709/205 |
| 8,549,013 | B1 * | 10/2013 | Sarma et al. | 707/748 |
| 8,554,701 | B1 * | 10/2013 | Dillard et al. | 706/12 |
| 8,700,480 | B1 * | 4/2014 | Fox et al. | 705/26.1 |
| 8,768,943 | B2 * | 7/2014 | Puttaswamy et al. | 707/758 |
| 8,769,417 | B1 * | 7/2014 | Robinson et al. | 715/751 |
| 8,788,671 | B2 * | 7/2014 | Richardson et al. | 709/226 |
| 2010/0191799 | A1 * | 7/2010 | Fiedorowicz et al. | 709/203 |
| 2011/0289156 | A1 * | 11/2011 | Pirnazar | 709/206 |
| 2011/0289157 | A1 * | 11/2011 | Pirnazar | 709/206 |
| 2012/0215639 | A1 * | 8/2012 | Ramer et al. | 705/14.53 |
| 2012/0215640 | A1 * | 8/2012 | Ramer et al. | 705/14.55 |
| 2012/0290399 | A1 * | 11/2012 | England et al. | 705/14.66 |
| 2013/0073336 | A1 * | 3/2013 | Heath | 705/7.29 |
| 2013/0080928 | A1 * | 3/2013 | Zhuang et al. | 715/758 |
| 2013/0132851 | A1 * | 5/2013 | Konopniki et al. | 715/736 |

\* cited by examiner

*Primary Examiner* — William Titcomb
(74) *Attorney, Agent, or Firm* — Lee & Hayes, PLLC

(57) ABSTRACT

Techniques for initiating a shared electronic browsing session for a plurality of users are described herein. A computing device may initiate the session and associate browsing and chat activity of the users with the session to enable at least one of real-time, joint browsing and chat or asynchronous browsing and chat. Further, the computing device may determine a social graph for one of the users based on the session and may recommend items to the user based on content browsing and chat activities of users included in the social graph.

26 Claims, 7 Drawing Sheets

Recommendations Just for You!

The Wise Men
By Walter Isaacson & Evan Thomas

List Price: $29.95
Your Price: $19.99 ← Recommendation 126

Red Delicious Apples

List Price: $1.23 per pound
Your Price: $0.97 per pound ← Recommendation 128

Eat, Pray, Love
By Elizabeth Gilbert

List Price: $9.95
Your Price: $1.99 ← Recommendation 130

Recommendations User Interface 124

Fig. 1c

COLLABORATIVE BROWSING AND CHAT SESSIONS

BACKGROUND

In recent decades, the growth of electronic commerce has enabled shoppers to buy an increasing number of products and services over the Internet and other networks. Books, videos, songs, clothing, and furniture can all be purchased on electronic commerce websites. The convenience and savings associated with electronic commerce make it likely that adoption of electronic commerce as a replacement for, or supplement to, shopping at physical locations will continue.

In some ways, however, electronic commerce lags behind traditional, physical location-based commerce. Two individuals who physically visit a store together can each see what products the other is viewing and can make recommendations. In contrast, electronic commerce lacks this collaborative, social experience. The electronic commerce shopper sits alone at his or her computer without benefit of a friend who is shopping at the same time and is viewing additional items that may be of interest to the shopper. Many electronic commerce sites try to be that friend, providing recommendations to the shopper based on products that the shopper has viewed. But such recommendations are still limited to products or services previously viewed by the shopper; they typically do not include and are not based on products or services browsed by friends contemporaneously shopping with the shopper.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 1a-1c illustrate example graphic user interfaces that enable collaborative browsing and chat amongst multiple shoppers and provide associated recommendations to at least one of the shoppers.

DETAILED DESCRIPTION

Overview

This disclosure describes, in part, techniques for initiating, by a collaboration service, a shared electronic browsing session for a plurality of users. The collaboration service may initiate the session and associate browsing and chat activity of the users with the session to enable at least one of real-time, joint browsing and chat or asynchronous browsing and chat. Further, the collaboration service may determine a social graph for a target user who is participating in the session and may recommend items to the target user based on browsing and chat activities of users included in the social graph. While many of the examples provided herein are directed to a collaborative shopping experience, it is to be understood that such shared electronic browsing sessions and recommendations may also be used with an electronic library, an electronic museum, or any collection of items/information.

Reference is made herein to "users" in a number of contexts. The user initiating a shared electronic browsing session is referred to as the "initiating user," the user receiving the recommendation is referred to as the "target user," and users participating in the shared electronic browsing session and users listed in the social graph are referred to simply as "users." The initiating user and target user may be the same user or different users. The initiating user is one of the users participating in the shared electronic browsing session, while the target user may or may not be one of the users participating in the shared electronic browsing session. The users participating in the shared electronic browsing session and the users listed in the social graph may be the same users or different groups of users with some overlap.

Figure 1A:
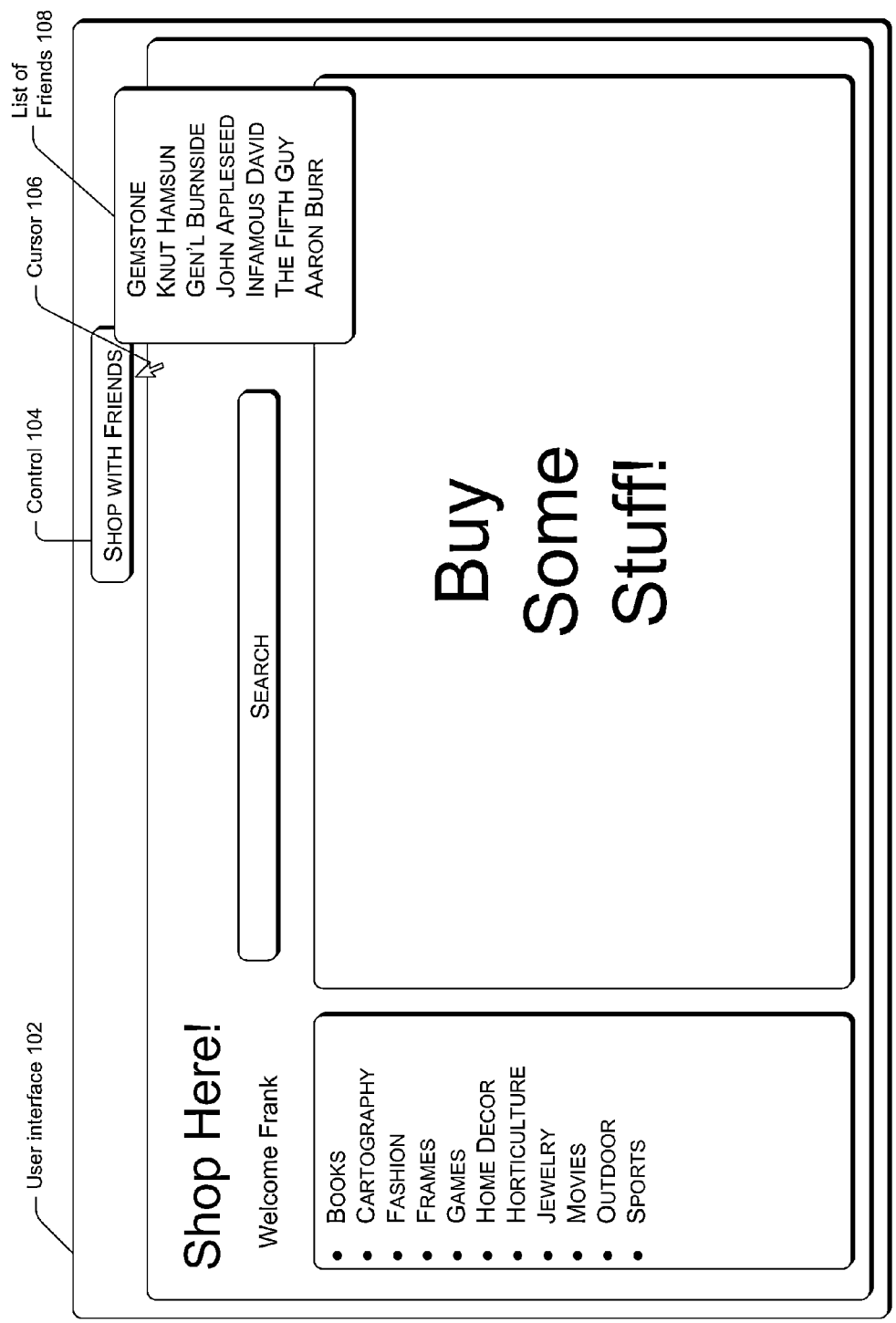

FIG. 1a illustrates an example user interface 102 enabling an initiating user to request a shared electronic browsing session. In various embodiments, the collaboration service initiates the shared electronic browsing session responsive to selection by the initiating user of one or more other users with whom the initiating user would like to browse items and chat. As shown in FIG. 1a, the user interface 102 may be, for example, a landing page of an electronic commerce service, and the initiating user may select a control 104, such as a button, labeled "Shop with Friends" on the user interface 102. The initiating user may select the control 104 by moving a cursor representation 106 over the control 104 or clicking on that control 104. In response to the selection, the user interface 102 may present a list 108 of other users that the initiating user may invite to the shared electronic browsing session. These other users may be social network friends of the initiating user, other contacts of the user, etc. The other users may include either online or offline users, or a combination of both online users and offline users. Selection of any offline users may result in the recording of the browsing and chat for later viewing and interaction by the offline users. In addition to, or in lieu of, selecting other users from the list 108 to invite, the initiating user may specify email addresses of one or more unlisted users to invite those users to participate in a shared electronic browsing session.

After initiating the shared electronic browsing session, the collaboration service may provide each of the users participating in the shared electronic browsing session with a shared session user interface that indicates browsing activities of each of the other users in the shared electronic browsing session, as well as with a chat window to enable conversation regarding each other's browsing activities. This shared session user interface may be provided to the initiating user as soon as the shared electronic browsing session has been initiated or may be later provided when a first of the invited users has elected to participate in the shared electronic browsing session.

Figure 1B:
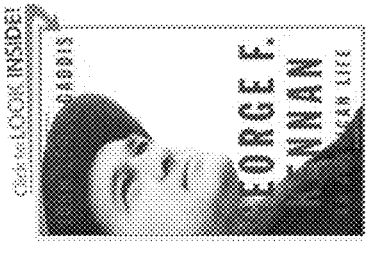

For example, FIG. 1b illustrates an example shared session user interface 110 that may be presented to the initiating user or another user following initiation of the shared electronic browsing session. As illustrated, the shared session user interface 110 may include a first portion 112 for browsing items, a second portion 114 for identifying other users participating in the session and for indicating what each of the other users is browsing, and a chat window 116 for the users to discuss their joint browsing activities.

The first portion 112 may display any of a number of different pages of a website. For example, the first portion 112 may display a home page with browsing and search options, a category page resulting from browsing, a search results page resulting from a search, or a details page associated with a specific item. In FIG. 1b, the first portion 112 displays a details page for a book entitled "George F. Kennan: An American Life." Such details pages may offer options for the users participating in the shared electronic browsing session to purchase the item being viewed either individually or as a group.

The second portion 114 of the shared session user interface may display identifiers 118 for the other users participating in the shared electronic browsing session. For example, the second portion 114 shown in FIG. 1 displays "Gemstone," "John Appleseed," and "Aaron Burr" as the other users. These identifiers 118 may be actual or fictitious names of the other users, user handles, screen names, etc. In addition, these one or more of these identifiers 118 may be accompanied by an indicator 120 of what the corresponding user is browsing. The indicator may be implemented as a hyperlink or other actionable reference to additional information regarding what the corresponding user is browsing.

For example, in FIG. 1b "Gemstone" is shown to be viewing "necklace with large diamonds." The "necklace with large diamonds" may be an item available from the same website from which the initiating user is currently browsing a webpage in the first portion 112 or may be an item offered by a different electronic commerce service or other service that shares a common authentication scheme with the service providing the web site shown in the first portion 112. The indicator 120 specifying the "necklace with large diamonds" may be selectable by the initiating user through, e.g., a mouse click, which may cause a webpage associated with the "necklace with large diamonds" to be displayed in the first portion 112.

"John Appleseed" is shown to be searching for "Red Delicious," and "Aaron Burr" is shown to be browsing the "Dueling Pistols" category. Selection of the "Red Delicious" indicator 120 may result in search results for "Red Delicious" being displayed in the first portion 112, and selection of the "Dueling Pistols" category indicator 120 may result in a webpage for the "Dueling Pistols" category being displayed in the first portion 112.

In some embodiments, the chat window 116 may include a plurality of comments 122 of the users participating in the shared electronic browsing session. The comments 122 may be about the items that the users are jointly browsing or may be unrelated to the items. The comments 122 may, for example, indicate positive or negative opinions regarding items or categories of items. Further, the comments 122 may be implemented as a hyperlink or other actionable reference, causing the collaboration service to initiate a search using the comment 122 as a search string. Results of the search may then be displayed in the first portion 112.

In some embodiments, the shared session user interface 110 may facilitate manual sharing of hyperlinks or other actionable references to, and/or information regarding, items being viewed during the shared electronic browsing session. For example, a user participating in the session may drag an item from first portion 112 to the second portion 114 of user interface 102, resulting in an indicator 120 or other link to that item being automatically presented to the other users participating in the shared electronic browsing session in their own shared session user interfaces. In other embodiments, a link to, and/or other information regarding the item may be provided to the other users through an email, SMS message, MMS message, blog post, microblog post, etc. In yet another embodiment, a user may copy a uniform resource locator (URL) and paste it to the second portion 114. This may result in a webpage corresponding to the URL being opened in the shared session user interfaces (e.g., in the first portions of the shared session user interfaces) being presented the other users.

As mentioned above, one or more of the other users invited to the shared electronic browsing session may be offline, and thus unable to participate in the session in real-time. Accordingly, in one embodiment, the collaboration service causes the shared electronic browsing session to be recorded and provides access to the recorded session to the other users when the other users are online. For example, a formerly offline user may view the recorded session via his or her own shared session user interface 110 that may have optional playback controls. The formerly offline user may then interact with the recorded session, adding comments 122 of his or her own that may then be conveyed by the collaboration service to the other users who participated in the shared electronic browsing session. These comments 122 may be conveyed via an email, SMS message, MMS message, blog post, microblog post, etc. or via the shared session user interfaces being presented to those other users who may still be participating in the session or who may also be asynchronously viewing the recorded session.

In some embodiments, rather than presenting the recorded session itself via the shared session user interface 110, the collaboration service may generate and provide a digest of the session. The digest may, for example, be a summary presented via the shared session user interface or an email describing what happened during the missed part of the shared electronic browsing session. For example, the digest may summarize what items were browsed, by whom, and at what time, as well as what comments were made, by whom, and at what time. In one embodiment, the digest may be provided as a dual column, time-aligned user interface, with one column for items browsed and the other for chat comments. The identifications of what items were browsed and the comments may be selected to view items and/or search results, as is described above with respect to shared user interface 110.

In various embodiments, the collaboration service may also apply sentiment analysis to the comments 122 from one or more shared electronic browsing sessions and use the results of the sentiment analysis to recommend other items to the users of the shared electronic shopping session. For example, one comment 122 may say "this is great" and the sentiment analysis of this comment may indicate a positive sentiment. The collaboration service may then determine what item was being viewed by the user who made the comment 122 at the time the comment 122 was made, and associate the positive sentiment with that item. These associations between sentiments and items may be used in recommending items to target users. For example, if a friend of a user says "I like soap," the collaboration service may determine that the user is expressing a positive sentiment and may recommend soap to the target user based on that positive sentiment.

In further embodiments, the collaboration service may recommend one or more items to a target user based at least in part on browsing activity and chat activity of other users in a social graph of the user, which browsing activity and chat activity may have occurred during a shared electronic browsing session. Such a shared electronic browsing session may occur between the target user and the other users in the target user's social graph or may occur between users in the target user's social graph without the target user's participation. The social graph may include users of such sessions as well as other contacts of the target user, such as social network friends. The collaboration service determines the items browsed by the users in the social graph and assumes, based on the existence of the social relationship, that the target user will be interested in that item. Further, the collaboration service may determine sentiments of the users in the social graph with respect to the items based on the chat activity, as described above. The collaboration service may then determine items that are associated with positive sentiments, and recommend those items to the target user.

As illustrated in FIG. 1c, one or more recommendations generated by the collaboration service may be presented to a target user through a recommendation user interface 124. The recommendation user interface may be provided during the shared electronic browsing session (e.g., as part of the session) or may provided at another time. In the illustrated example, the recommendation user interface 124 includes a first recommended item 126, a second recommended item 128, and a third recommended item 130. The first recommended item 126, a book entitled "The Wise Men," may be related to the item 112 browsed in FIG. 1b. The second recommended item 128, an item called "Red Delicious Apples," may be related to the browsing activity of one of the other users, John Appleseed, shown by an indicator 120 in FIG. 1b. The third recommended item 130, a book entitled "Eat Pray Love," may be related to the comment 122 made by another user, Gemstone, in FIG. 1b.

Example Network

Figure 2:
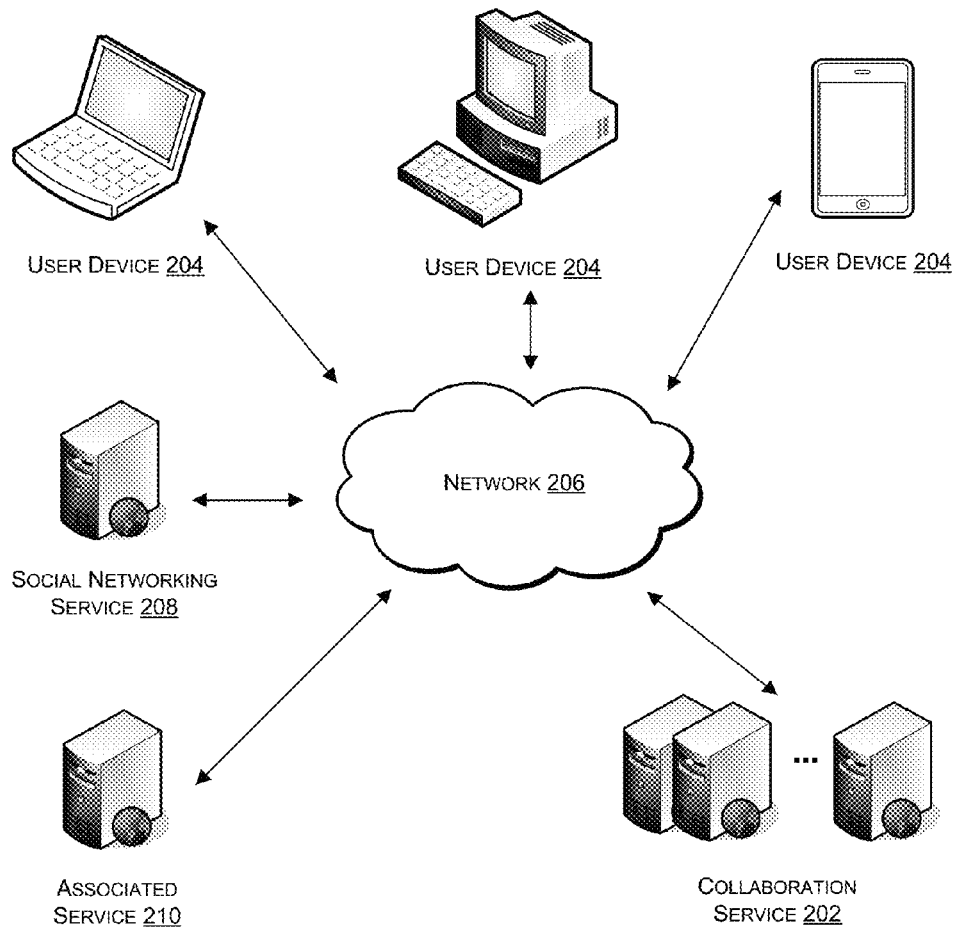
FIG. 2 illustrates an example network environment in which a collaboration service provides a shared electronic browsing session between a plurality of user devices, the shared electronic browsing session enabling users to jointly browse items and chat.

FIG. 2 illustrates an example network environment in which a collaboration service provides a shared electronic browsing session between a plurality of user devices, the shared electronic browsing session between the user devices enabling the user devices to jointly browse items and chat. As illustrated, a collaboration service 202 communicates with a plurality of user devices 204 over a network 206 and provides a shared electronic browsing session for the user devices 204. The collaboration service 202 may also communicate with a social networking service 208 (e.g., a social network website) to obtain a list of contacts for a user. Further, the collaboration service 202 may also communicate with associated services 210. In some embodiments, the collaboration service 202 shares a common authentication scheme, such as a common login (e.g., username and password) with one or more associated services 210 (e.g., another retail website, content sharing website, etc.), and thus, enables a user to view or browse items offered or available from a different service 210 while participating in the shared electronic browsing session being provided by the collaboration service 202.

The collaboration service 202 illustrated in FIG. 2 may correspond to a computing device configured to provide a shared electronic browsing session among the user devices 204. For example, the collaboration service 202 may include one or more processors and a computer storage or memory which contains software applications or modules executed by the processors. In some embodiments, the collaboration service 202 may correspond to a logical association of one or more computing devices, such as an application server for providing the shared electronic browsing session, a web server for creating and transmitting user interfaces, and a database server for storing data regarding users, items being browsed, content, comments, and the like. In some embodiments, the features and services provided by the collaboration service 202 may be implemented as web services consumable via the network 206. In further embodiments, the collaboration service 202 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In various embodiments, the social networking service 208 and other services 210 may each be implemented on one or more computing devices, web services, or hosted computing environments as described above in connection with the collaboration service 202. In addition, the collaboration service 202, social networking service 208, other services 210 and/or the users devices 204 may each be a computing device, such as a personal computer (PC), a laptop computer, a server, a server farm(s), a mainframe, a tablet computer, a work station, a telecommunication device, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

Those skilled in the art will appreciate that a single user may be associated with a plurality of user devices 204, logging in from any one user device or from multiple user devices. A single user device 204 may also be associated with multiple users, with each user having a separate browser/client window open and logged into the collaboration service. Each user device 204 may have a browser or other client that is capable of connecting to one or more of the collaboration service 202, the social networking service 208, and the other services 210, and the browser of other client receiving code for generating user interfaces, such as web pages, from those services. Each user device 204 may further have a display and one or more input mechanisms to enable the users to interact with the user interfaces received from the collaboration service 202, the social networking services 208, and the other services 210.

In some embodiments, the social networking service 208 may be a dedicated social networking service (e.g., a social networking website) or another service that provides social networking features (e.g., a retail website with social networking features). The social networking service 208 may enable a user to identify contacts (e.g., friends, acquaintances, persons of interest, etc.), maintain the user's contacts in a list or in a social graph that represents the relationship between the user and each of his/her contacts), provide the user with updates on his/her contacts, and provide the user with the ability to find and communicate with his/her contacts. The social networking service 208 may also maintain an indication of whether a contact on the list is online or offline. Further, the social networking service 208 may make the list or graph, and online/offline indicia available to other websites and services, such as collaboration service 202. In further embodiments, the social networking service 208 may generate a user interface for display on the user's device 204 that includes a control, such as a button, icon, etc. that, when selected by the user, launches the shared electronic browsing session provided by the collaboration service 202 and causes a list of contacts to be presented to the user from which the user may invite contacts for the shared electronic browsing session. In other embodiments, such controls for launching the shared electronic browsing session may be provided through a user interface of the collaboration service 202. The collaboration service 202 may then provide a user interface, such as the shared session user interface 110 described above.

In some implementations, the network 206 may be any sort of network or networks that connect the collaboration service 202, user devices 204, social networking service 208, and associated services 210, as mentioned above. Also, the network 206 may connect any of the collaboration service 202, user devices 204, social networking service 208, and associated services 210 to other devices. The network 206 may be any type of network, such as a wide area network (WAN), a local area network (LAN), or the Internet. Also, the network 206 may be public, private, or include both public and private networks. Further, the network 206 may be wired, wireless, or include both wired and wireless networks. The network 206 may utilize any one or more protocols for communication, such as the Internet Protocol (IP), other packet based protocols, or other protocols. Additionally, the network 206 may comprise any number of intermediary devices, such as routers, base stations, access points, firewalls, or gateway devices.

Example Computing Device

Figure 3:
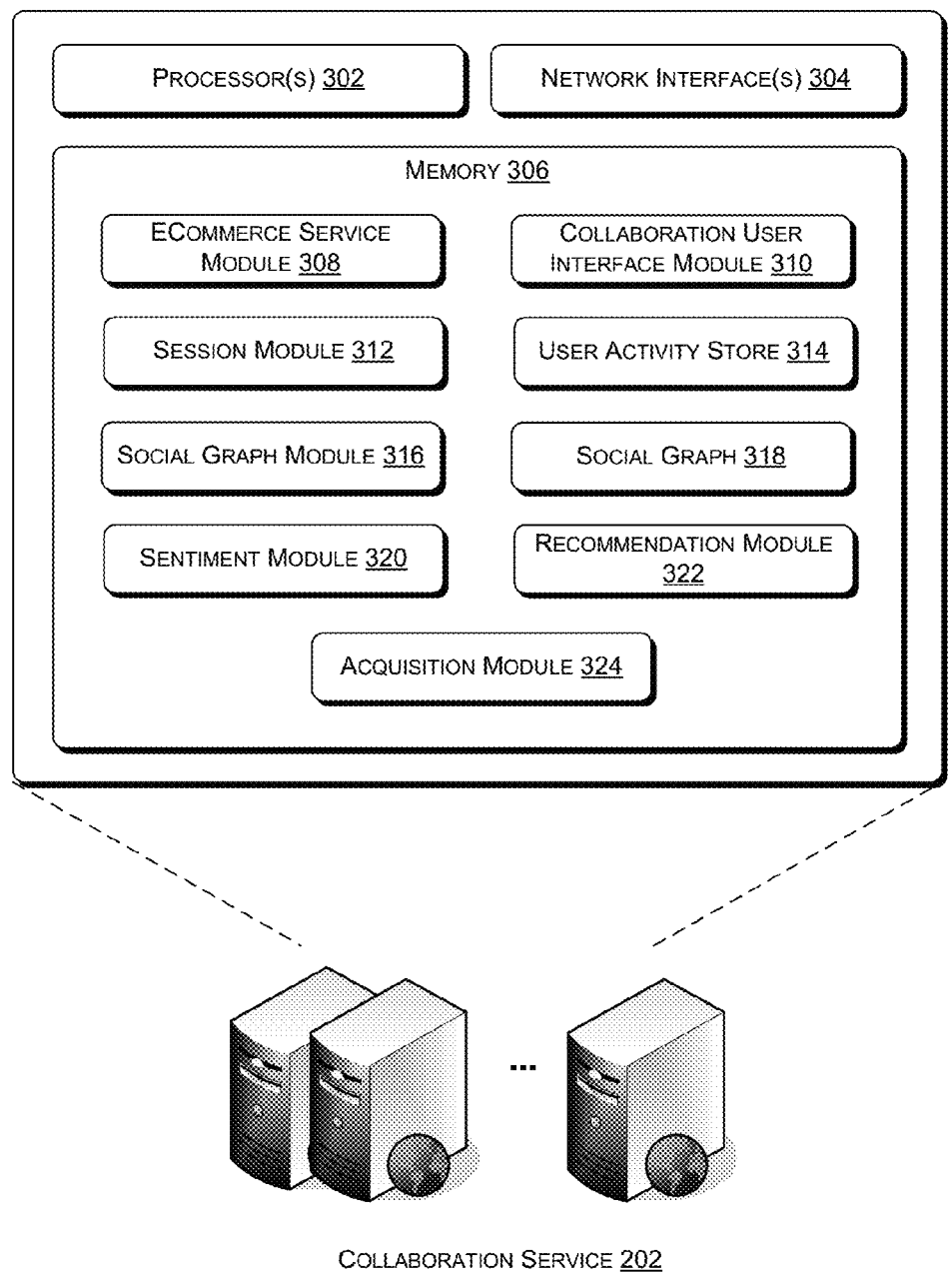
FIG. 3 illustrates an example collaboration server configured to initiate a shared electronic browsing session between a plurality of user devices and to recommend items to a target user based at least in part on browsing and chat activities of other users associated with the target user's social graph.

FIG. 3 illustrates an example computing device(s) implementing the collaboration service 202 that is configured to provide a shared electronic browsing session among the user devices 204 and to recommend items to a target user based at least in part on browsing and chat activities of other contacts from the user's social graph. As illustrated, one or more computing devices of the collaboration service 202 include processor(s) 302, network interface(s) 304, and memory 306. The processor(s) 302 may include any one or more central processing units or graphic processing units. The network interface(s) 304 may support both wired and wireless connections to networks, such as cellular networks, radio, WiFi networks, short range networks (e.g., Bluetooth, IR, and so forth.). The memory 306 (and other memories described throughout) is an example of computer-readable storage media and may include volatile, nonvolatile memory, and/or other persistent and/or auxiliary non-transitory computer-readable storage media. Thus, the memory 306 may include, but is not limited to, RAM, ROM, EEPROM, flash memory, or other memory technology, or any other medium which can be used to store content, applications for access by a computing device of the collaboration service 202.

In one embodiment, the memory 306 stores an ecommerce service module 308, a collaboration user interface module 310, a session module 312, a social graph module 316, a sentiment module 320, a recommendation module 322, and an acquisition module 324 as shown in FIG. 3. As described in more detail below, these modules are executed by the processor(s) 302 to provide a shared electronic browsing session to multiple users. In addition, the memory 306 may store social network data 318 and user activity data 314, which is used by the above-mentioned modules. While the modules and data are shown in FIG. 3 as being stored in a memory of a single computing device, it is to be understood that the modules and data may be distributed among a plurality of local and/or remote computing devices, and/or may be implemented as, or provided by, other web services. Moreover, the memory 306 may be used to store any number of functional modules that are executable on the processors 302, as well as data and items that are rendered by a computing device of the collaboration service 202. Thus, the memory 306 may, for example, store an operating system.

In various embodiments, memory 306 includes an ecommerce service module 308. The ecommerce service module 308 may serve web pages associated with an electronic commerce site, such as an electronic commerce site of the collaboration service 202 or an electronic commerce site of an associated service, such as one of the associated services 210. The ecommerce service module 308 may provide a home or landing page, such as user interface 102, a login page, categories pages associated with browsing, search results pages, detail pages for items, and acquisition and account information pages. On any one or more of these pages, the ecommerce service module 308 may include an icon, button, or other graphic control enabling an initiating user to request a shared electronic browsing session. Responsive to selection of the icon, button, or control, the initiating user may be presented with a drop-down list of users derived from a social graph of the initiating user that the initiating user may select from. In other embodiments, the ecommerce service module 308 may instead present a new page with that list and/or with a field enabling the initiating user to specify a user to invite by, e.g., providing that user's email address.

As described above, a shared electronic browsing session may be requested by an initiating user of the collaboration service 202 itself, by an initiating user of social networking service 208 or by an initiating user of an associated service 210, such as a retail website the user may be browsing. In one embodiment, initiation and management of the shared electronic browsing session is provided by the session module 312, which processes the request to initiate the electronic browsing session received through the ecommerce service module 308, through the social networking service 208, or through an associated service 210. The request may include the identities of those contacts selected by the initiating user to participate in the shared electronic browsing session, as well as the online status of each, particularly if the request is received via the social networking service 208 or through an associated service 210 that has its own social network features. In other embodiments, the session module 312 may retrieve the online status for one or more invited contacts from the social networking service 208, one or more associated services 210 or another source. The session module 312 may also retrieve email addresses and other social network information from the user's social graph as maintained by the social networking service 208, one or more associated services 210 or another source. In addition or alternatively, the request itself may include an email address or like identifier for one or more of the selected contacts. The session module 312 may then invite all selected contacts by, e.g., sending an email, SMS message, MMS message, text message or voicemail message; posting a message on to the contact on his or her social networking service wall or bulletin board, posting a microblog message to the user's contacts, etc. In some embodiments, the session module 312 may post the invitation as an advertisement opening the shared electronic browsing session to any or select advertisement viewers. Such an advertisement may also be posted on the social network service wall or bulletin board of the initiating user or of an invited user; or posted as a microblog message to the invited user's or initiating user's contacts.

Either upon initiating the shared electronic browsing session or after one or more invitees accept the invitations, one or more shared session user interfaces, such as user interface 110 of FIG. 1b may be generated by the collaboration user interface module 310 of the collaboration service 202 and presented via the user device 204 to each user participating in the shared electronic browsing session.

The session module 312 may also determine the items currently being browsed by each of the users and update the indications of browsed items provided through the shared session user interfaces in real-time. In addition, the session module 312 may record the browsing activity in the user activity store 314 in associated with a session identifier. Also, the session module 312 may record chat activity, such as user comments, in the user activity store 314 in association with a session identifier.

When an invited user who has been offline during the shared electronic browsing session comes online, the session module 312 may generate a playable experience of the shared electronic browsing session for viewing by the previously offline user. The session module 312 may generate this playable experience from the user activity store 314, retrieving browsing activity and chat activity associated with a session identifier of the shared electronic browsing session. In other embodiments, the session module 312 may additionally or instead generate digests in the form of emails or other user interfaces. Such digests/user interfaces may be two column summaries of session activities, with one column associated with browsing activity and the other with chat activity. The columns and activities may be time-aligned so that, for example, a chat from 9:15 am to 9:30 am may be shown parallel to three websites that were viewed during those times. In embodiments where the recorded session involved more than one user, the digest may identify which users are associated with which chat comments and which browsing activities.

In some embodiments, the session module 312 may further enable a user to delete that user's comments and browsing history from the session or to leave the session, thereby not receiving further updates of browsing and chat activities for the session.

In various embodiments, the user activity store 314 may store information about browsing activities and chat activities for shared electronic browsing sessions. The information may include indications of items browsed, identities of users that browsed the item, and times at which the item was browsed. The information may further include indications of chat comments, identities of the commenters, and times at which the comments were made. These items of information are associated with a session identifiers of the shared electronic browsing session and may be used to generate time-based mappings of comments to browsed items for given sessions. The user activity store 314 may be a database, file, or any other sort of data structure used to persist information in an organized form.

In further embodiments, the social graph module 316 may generate the social graph 318 from any of a number of sources. The social graph module 316 may retrieve friend lists from social networking services 208, may receive other contacts from user devices 204 and may note users that accepted invites responsive to their email addresses being specified. All of these friends, contacts, and users may form the social graph 318 for a user. In addition to identities of those included in the social graph 318, the social graph module 316 may determine online/offline statuses for those included in the social graph 318 by communicating with the social networking service 208 and may store indications of the online/offline statuses in the social graph 318. The social graph module 316 may also determine sessions that each person included in the social graph 318 is associated with and may store indications of the session associations in the social graph 318.

In various embodiments, the sentiment analysis module 320 retrieves comments from the user activity store 314 and determines if the comments are associated with positive or negative sentiments. The sentiment analysis module 320 may utilize any of a number of programmatic algorithms and/or a mechanical turk to determine with a given comment expresses positive sentiments or negative sentiments. The sentiment analysis module 320 may then determine which item the determined sentiment is associated with by reference to the user activity store 314, which maintains time-based mappings between comments and concurrent browsing activities. If a comment could be associated with multiple items, the sentiment analysis module 320 may determine which item to apply the sentiment to based on the context of the surrounding comments. The sentiment analysis module 320 may also determine the user that posted each comment. After making these determinations, the sentiment analysis module 320 may update the user activity store 314, adding the determined sentiments and indications of which items and users the sentiments are associated with.

In various embodiments, the recommendation module 322 generates recommendations for a target user based on the browsing activities and chat activities of other users included in the user's social graph 318. The recommendation module 322 may generate recommendations periodically or in response to an event, such as a request for recommendations. To generate recommendations for a target user, the recommendation module 322 first determines the friends, other contacts, and other users includes in the specific user's social graph 318. The recommendation module 322 then consults the user activity store 314 to determine browsing activity and chat activity associated with the users in the social graph 318. Also, the recommendation module 322 may retrieve from the user activity store 314 sentiments derived from the chat activity and associated with the browsing activity. These sentiments may be used to weight or filter the items included in the retrieved browsing activity. The recommendation module 322 may then determine the items to recommend based on the items retrieved (and optionally weighted/filtered) from the browsing activity. In some embodiments, the determination may also take into account a browsing history of the target user. The recommendation module 322 may then provide the recommendations through a user interface, such as through the recommendations user interface 124, through the collaboration user interface 310, or through a notification, such as an email message. In one embodiment, the recommendation module 322 may add the recommended item to a registry, a targeted email, a wish list, or gift list associated with the specific user. In further embodiments, the recommendation module 322 may provide deals or promotions related to the recommend items or to other items the specific user has previously viewed.

In some embodiments, the memory 314 further includes an acquisition module 324. The acquisition module 324 may be invoked by the ecommerce service module 308, for example, to process orders to purchase items. The acquisition module 324 may also enable group purchases of items by users of shared electronic browsing sessions.

In some instances, the computing device(s) of the collaboration service 202 may have features or functionality in addition to those that FIG. 3 illustrates. For example, the computing device(s) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within the computing device(s) may reside remotely from the computing device(s). In such implementations, the computing device(s) may utilize the network interfaces 304 to communicate with and utilize this functionality.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Example Processes

Figure 4:
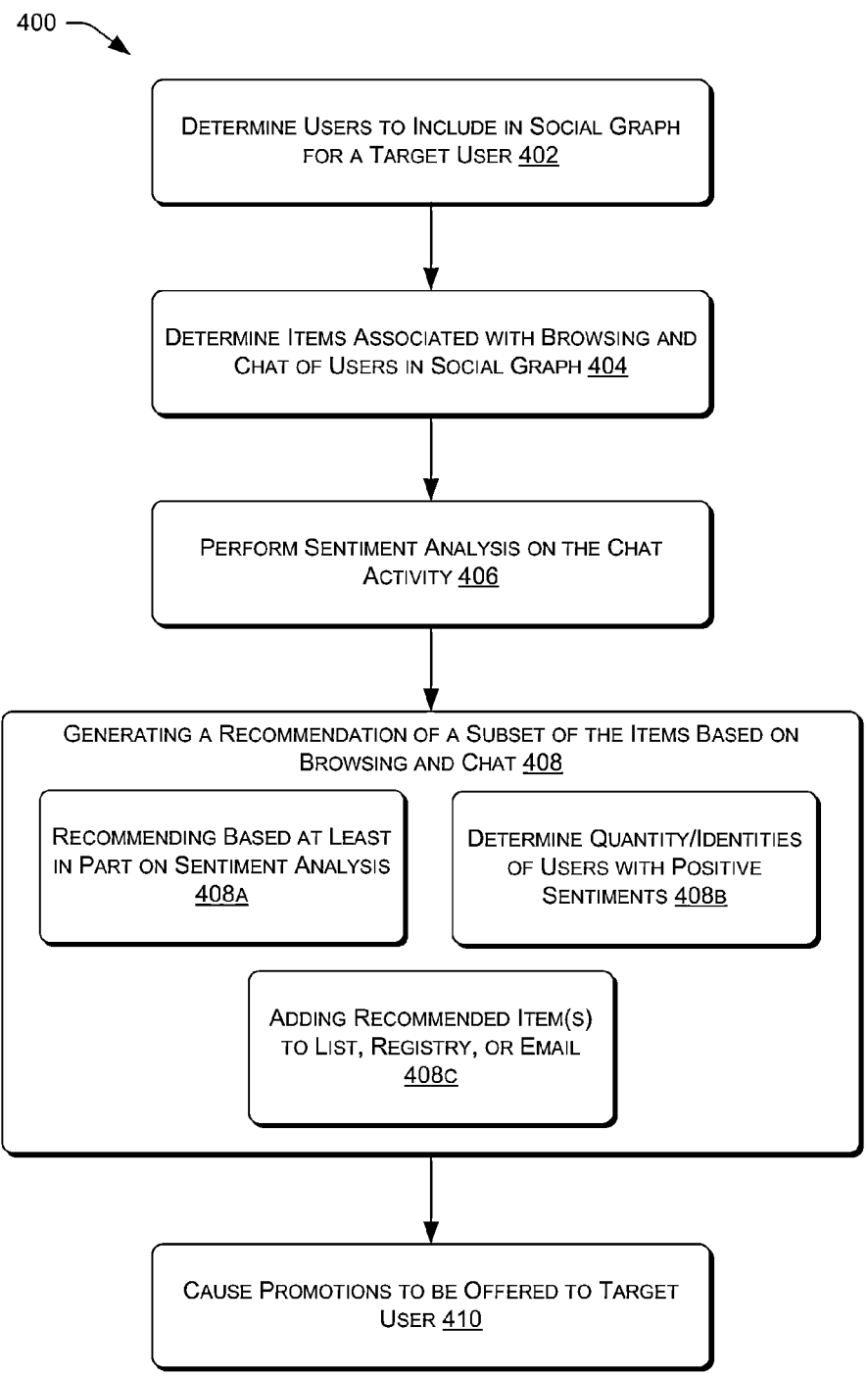
FIG. 4 illustrates an example process for recommending items to a target user based at least in part on browsing and chat activities of other users associated with the user's social graph.

FIG. 4 illustrates an example process 400 for recommending items to a target user based on browsing and chat activities of other users associated with the target user's social graph. This process (as well as each process described herein) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 400 includes, at 402, determining by a computing device one or more users to include in a social graph for a target user. The social graph may include at least one of one or more contacts of the target user, such as social network friends of the target user, or a user that the target user has invited to participate in a shared electronic browsing session. At 404, the computing device determines items associated with browsing activity and chat activity of the users included in the social graph. The browsing activity and chat activity may be joint browsing activity and chat activity associated with a shared electronic browsing session.

At 406, the computing device may perform sentiment analysis on the chat activity to determine sentiments of the users with respect to items associated with the chat activity.

At 408, the computing device may generate a recommendation of a subset of the items for the target user based at least in part on the browsing activity and the chat activity. The subset may include one, less than all, or all of the items. At 408a, the generating may be performed based at least in part on the sentiment analysis. At 408b, the computing device may determine a quantity of users included in the social graph that have positive sentiments regarding the recommended items or determine identities of users included in the social graph that have positive sentiments regarding the recommended items. At 408c, the generating may include adding the recommended items to a wish list, a gift list, a targeted email, or a registry.

At 410, the computing device may provide promotions associated with an item based on at least in part on the browsing activity or chat activity of users included in the social graph.

Figure 5:
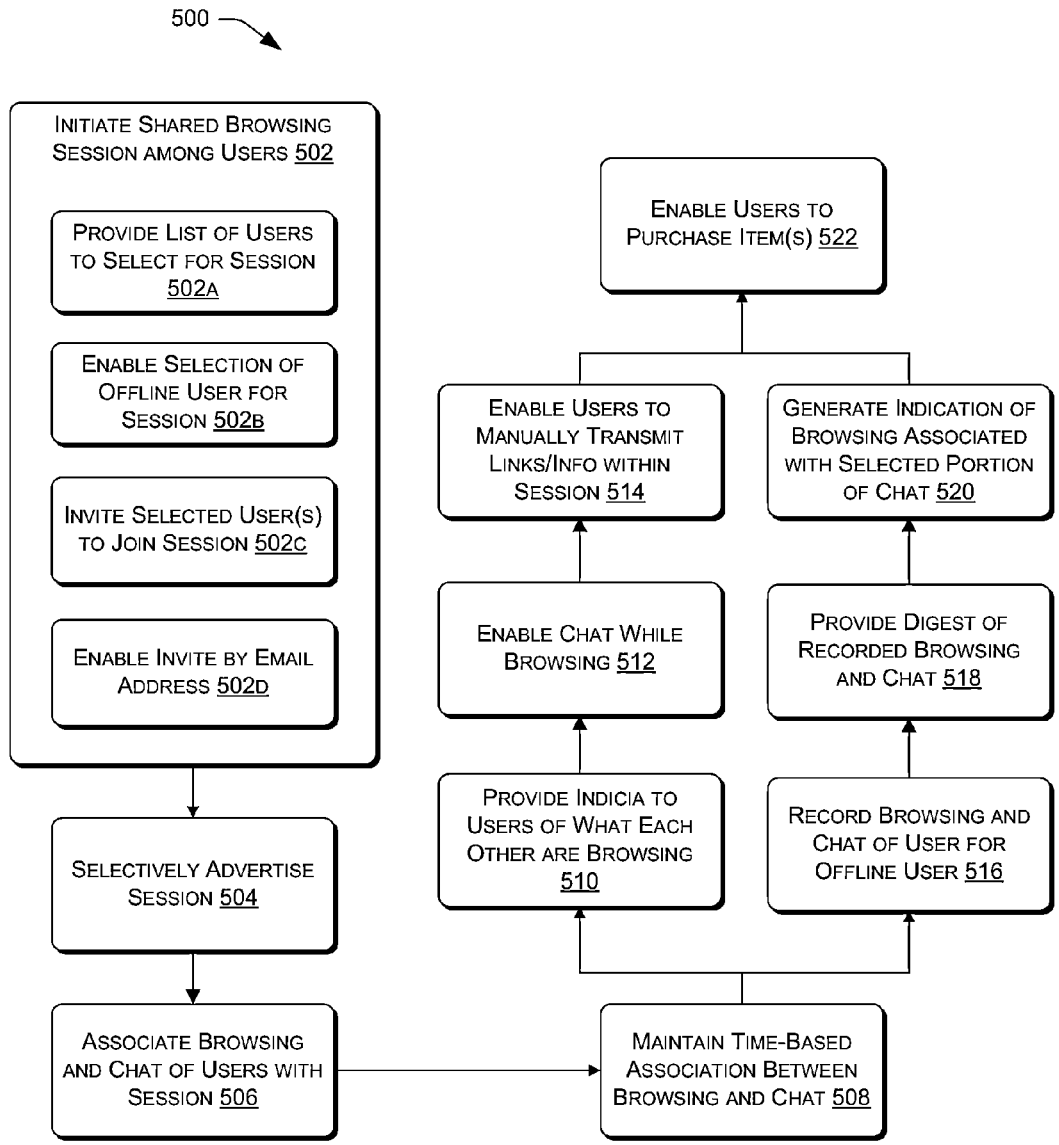
FIG. 5 illustrates an example process for initiating a shared electronic browsing session among a plurality of users and associating the browsing and chat activities with the shared electronic browsing session to enable joint or asynchronous browsing or chat.

FIG. 5 illustrates an example process 500 for initiating a shared electronic browsing session among a plurality of users and associating browsing and chat activities of the users with the shared electronic browsing session to enable joint or asynchronous browsing or chat.

The process 500 includes, at 502, initiating, by a computing device, a shared electronic browsing session for a plurality of users. The shared electronic browsing session may be a unified session across multiple websites sharing a common authentication scheme. At 502a, the initiating may comprise comprises providing an initiating user with a list of users associated with a social graph of the initiating user and enabling that initiating user to select one or more users from the list. Alternatively or additionally, at 502b, the initiating may include enabling the initiating user to invite another, offline user to join the shared electronic browsing session. At 502c, the computing device may invite the selected user to join the shared electronic browsing session. Alternatively or additionally, at 502d, the initiating may include enabling the initiating user to invite another of the users to join the shared electronic browsing session by providing an email address of the other user. At 504, in addition to or instead of inviting users, the computing device may selectively advertise the shared electronic browsing session to a number of users to enable the users receiving or viewing the advertisement to join the shared electronic browsing session.

At 506, the computing device may associate browsing activity and chat activity of the users with a session identifier of the shared electronic browsing session to enable at least one of real-time, joint browsing and chat or asynchronous browsing and chat. At 508, the computing device may also maintain, in connection with the shared electronic browsing session, a time-based association between browsing activity and chat activity.

At 510-520, the computing device may share, in substantially real-time or asynchronously, browsing activity and chat activity of each of the users with the others of the users. At 510-514, the computing device may share, in substantially real-time, browsing and chat. At 510, the computing device may provide each user associated with the shared electronic browsing session with an indication of a current browsing activity of at least one of the other users, the current browsing activity being associated with the shared electronic browsing session. At 512, the computing device may, in addition, cause display of a chat window to facilitate commenting on items being browsed and/or reading such comments as part of the real-time browsing. At 514, the computing device may also enable one of the users to manually share a link or other information with the other users during the browsing activity.

Alternatively or additionally, at 516-520, the computing device may asynchronously share browsing and chat. At 516, the computing device may record browsing activity and chat activity of the users and associate the recorded browsing activity and chat activity with the shared electronic browsing session to enable asynchronous browsing and chat when an offline user comes online. At 518, the computing device may provide a digest of the recorded browsing activity and chat activity to the offline user. The digest may have two portions, with one portion associated with recorded browsing activity and the other portion associated with recorded chat activity, the portions being time-synchronized with respect to each other. At 520, the computing device may receive a selection of a part of the recorded chat activity and provide, in response, an indication of recorded browsing activity associated with the selected part of the recorded chat activity.

At 522, the computing device may enable participants in the shared electronic browsing session to purchase an item, either as a group purchase or as separate individual purchases of the item.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more non-transitory computer readable storage media;
   one or more processors; and
   one or more modules stored in the one or more non-transitory computer readable storage media and executed by the one or more processors to:
   associate a shared electronic session with chat activity of a first user and a second user and a first browsing activity of the first user and a second browsing activity of the second user, wherein the first browsing activity and the second browsing activity are each associated with one or more items available for purchase via an electronic commerce website;
   transmit, to the first user, an indicator representing the second browsing activity of the second user, wherein the second browsing activity of the second user is independent of the first browsing activity of the first user;
   determine a sentiment of at least the first user or the second user with respect to one or more items associated with the browsing activity of the first user or the second user based at least in part on performing sentiment analysis on the chat activity; and
   recommend at least one item of the one or more items to the at least the first user or the second user.

2. The system of claim 1, wherein the one or more modules are further executed by the one or more processors to enable the first user or the second user to purchase an item of the one or more items.

3. The system of claim 1, wherein the one or more modules are further configured to add the at least one item to at least one of a wish list, a gift list, a registry, or a targeted email.

4. The system of claim 1, wherein the indicator is determined, at least in part, on the shared electronic session, or asynchronously browsing activity and chat activity of the first user or the second user, the asynchronous activity being associated with a selected part of the chat activity.

5. A computer-implemented method under control of one or more computing devices configured with specific computer-executable instructions:
   associating an indicator of a first browsing activity of a user with a shared electronic session between a target user and the user, wherein the first browsing activity of the user is independent of a second browsing activity of the target user;
   transmit, to the target user, the indicator, the indicator further representing a first item available for purchase via an electronic commerce website;
   determining one or more other items associated with the first browsing activity of the user; and
   generating a recommendation for the target user that includes at least one item of the one or more other items based at least in part on the first browsing activity.

6. The computer-implemented method of claim 5, wherein the first browsing activity is associated with a second shared electronic session among the target user and at least one or more other users.

7. The computer-implemented method of claim 5, further comprising determining that the user is included in a social graph of the target user based at least partly on a first indication that the target user has invited the user to participate in the shared electronic session or a second indication that the user is included within one or more contacts of the target user.

8. The computer-implemented method of claim 5, further comprising performing sentiment analysis on a chat activity of the user or target user to determine a sentiment of the user with respect to the one or more items; and wherein generating the recommendation is based at least in part on the first browsing activity, the chat activity, and the sentiment of the user.

9. The computer-implemented method of claim 8, further comprising:
   determining a quantity of users included in the social graph that have a positive sentiment regarding the at least one item; or
   determining an identity of at least one user included in the social graph that has a positive sentiment regarding the at least one item.

10. The computer-implemented method of claim 5, further comprising performing sentiment analysis on a chat activity of the user or target user to determine a sentiment of the target user with respect to the one or more items; and wherein generating the recommendation is based at least in part on the second browsing activity, the chat activity, and the sentiment of the target user.

11. The computer-implemented method of claim 5, further comprising causing a promotion to be offered to the target user based at least in part on the second browsing activity or a chat activity of the user and the target user.

12. A non-transitory computer-readable medium storing computer-executable instructions that, when operated by a processor, perform operations comprising:
   initiating a shared electronic session between a first user and a second user;
   during the shared electronic session, sharing, in substantially real-time or asynchronously, an indicator representing a first browsing activity associated with the user with the second user, the first browsing history being independent from a second browsing history of the second user.

13. The non-transitory computer-readable medium of claim 12, wherein initiating the shared electronic session comprises:
   providing the first user with a list of users included in a social graph of the first user;
   enabling the first user to select one or more users from the list of users; and
   generating an invitation to the one or more users to join the shared electronic session.

14. The non-transitory computer-readable medium of claim 12, wherein initiating the shared electronic session comprises enabling the first user to invite a third user to join the shared electronic session by providing an email address of the third user.

15. The non-transitory computer-readable medium of claim 12, wherein the operations further comprise maintaining, in connection with the shared electronic session, a time-based association between the browsing activity and the chat activity.

16. The non-transitory computer-readable medium of claim 12, wherein the shared electronic session is a unified session across multiple network resources sharing a common authentication scheme.

17. The non-transitory computer-readable medium of claim 12, wherein the operations further comprise providing at least one user not participating in the shared electronic session an advertisement of the shared electronic session.

18. The non-transitory computer-readable medium of claim 12, wherein the sharing further comprises causing a chat window to be presented to at least one of the first user or the second user to facilitate the at least one of the first user or the second user in making or reading comments regarding items being browsed as part of the shared electronic session.

19. The non-transitory computer-readable medium of claim 12, further comprising enabling the first user to manually transmit at least one of information regarding an item being browsed or a link to the information regarding the item being browsed to the second user during the shared electronic session.

20. The non-transitory computer-readable medium of claim 12, wherein initiating the shared electronic session comprises enabling the first user to invite a third user who is offline to join the shared electronic session.

21. The non-transitory computer-readable medium of claim 20, wherein the operations further comprise:
during the shared electronic session, recording browsing activity and chat activity of the first user and the second user; and
providing to the third user access to the browsing activity and the chat activity of the first user and the second user to enable asynchronous browsing and chat to the third user when the third user is online.

22. The non-transitory computer-readable medium of claim 21, wherein the operations further comprise providing access to a digest of the browsing activity and the chat activity to the third user, wherein the digest is a playable media of the shared electronic session for the third user.

23. The non-transitory computer-readable medium of claim 22, wherein the operations further comprise:
receiving, from the third user, a selection of a part of the chat activity; and
generating, for the third user, an indication of a recorded browsing activity associated with the part of the chat activity.

24. The non-transitory computer-readable medium of claim 22, wherein the digest comprises a first portion associated with the browsing activity and a second portion associated with the chat activity, wherein the first portion associated with the browsing activity is time-synchronized with the second portion associated with the chat activity.

25. A non-transitory, computer-readable medium having a computer-executable module, that when executed by a computing device, provides a shared electronic session, the computer-executable module comprising:
a module that generates a user interface comprising a first portion that displays a first item being viewed by a first user of the user interface and that enables the first user to interact with the first item;
a second portion that displays a representation of a second user participating in the shared electronic session and, an indication for a second item being viewed by the second user independent of the first user; and
a third portion that displays a chat window that includes comments from the second user participating in the shared electronic session and that enables the first user to enter comments.

26. The non-transitory, computer-readable medium of claim 25, wherein selection by the first user of the indication of the second item being viewed by the second user or of a comment included in the chat window causes the first portion to display the second item associated with the indication or the comment.

* * * * *